(12) United States Patent
Kumra et al.

(10) Patent No.: US 11,486,602 B2
(45) Date of Patent: Nov. 1, 2022

(54) FOLDABLY PACKED TEMPERATURE ADJUSTMENT FAN AND FOLDING METHOD THEREOF

(71) Applicant: Jmatek (Zhongshan) Ltd., Zhongshan (CN)

(72) Inventors: Naresh Kumra, Zhongshan (CN); Yi Pu, Zhongshan (CN); Huoxi Zhou, Zhongshan (CN)

(73) Assignee: Jmatek (Zhongshan) Ltd., Zhongshan (CN)

(*) Notice: Subject to any disclaimer, the term of this patent is extended or adjusted under 35 U.S.C. 154(b) by 279 days.

(21) Appl. No.: 16/762,494

(22) PCT Filed: Jan. 8, 2020

(86) PCT No.: PCT/CN2020/070810
§ 371 (c)(1),
(2) Date: May 7, 2020

(87) PCT Pub. No.: WO2021/093152
PCT Pub. Date: May 20, 2021

(65) Prior Publication Data
US 2022/0003452 A1 Jan. 6, 2022

(30) Foreign Application Priority Data
Nov. 11, 2019 (CN) .......................... 201911096980.9

(51) Int. Cl.
*F24F 13/20* (2006.01)
*F24F 5/00* (2006.01)
(Continued)

(52) U.S. Cl.
CPC ............ *F24F 13/20* (2013.01); *F24F 5/0035* (2013.01); *F24F 1/02* (2013.01); *F24F 13/00* (2013.01);
(Continued)

(58) Field of Classification Search
CPC ............... F24F 1/02; F24F 13/20; F24F 13/00
See application file for complete search history.

(56) References Cited

U.S. PATENT DOCUMENTS

| | | | |
|---|---|---|---|
| 7,814,617 B2 * | 10/2010 | Frank ........................ | E05D 3/16 16/366 |
| 2001/0039762 A1 * | 11/2001 | Giovannetti .......... | E05F 1/1091 49/246 |

FOREIGN PATENT DOCUMENTS

CN 104864521 A * 8/2015

* cited by examiner

*Primary Examiner* — Lionel Nouketcha
(74) *Attorney, Agent, or Firm* — Wang Law Firm, Inc.

(57) ABSTRACT

The present invention provides a foldably packed temperature adjustment fan, which comprises a water tank assembly, having a water storage cavity; and a shell assembly, mounted on a top of the water tank assembly, wherein the shell assembly comprises a plurality of side plate assemblies for surrounding and forming an airflow cavity and a top plate assembly, at least a part of the side plate assemblies are respectively utilized as a whole body and are detachably mounted on an edge of the top of the water tank assembly, and at least a part of the side plate assemblies can be completely accommodated in the water storage cavity after being detached. The present invention further provides a folding method of the foldably packed temperature adjustment fan. When the temperature adjustment fan of the present invention is used, its appearance is the same as that of a normal unit; during packing, a rear plate assembly, a left side plate assembly and a right side plate assembly can be completely accommodated in the water tank assembly, a front panel assembly does not need to be detached, and as long as the front panel assembly is turned over, fast folding (Continued)

is completed; and the package size is small, associated components are less, and logistics transportation is convenient.

4 Claims, 12 Drawing Sheets

(51) Int. Cl.
    *F24F 13/00*            (2006.01)
    *F24F 1/02*             (2019.01)

(52) U.S. Cl.
    CPC ... *F24F 2013/205* (2013.01); *F24F 2221/125* (2013.01)

FOLDABLY PACKED TEMPERATURE ADJUSTMENT FAN AND FOLDING METHOD THEREOF

TECHNICAL FIELD

The present invention belongs to the technical field of home appliances, and specifically relates to a foldably packed temperature adjustment fan and folding method thereof.

BACKGROUND

With the improvement of people's living standard, the traditional fan gradually cannot meet daily use requirements of the people, and a fan with a temperature adjustment function is gradually widely applied. The existing temperature adjustment fan (an air cooler) is generally provided with a water tank, a water pump is arranged in the water tank and is used for pumping room-temperature water in the water tank and conveying the water to an upper portion of a water curtain, the water evaporates and absorbs heat through the water curtain to reduce temperature of surrounding air, and a motor drives a wind wheel to rotate to generate wind so as to drive the cooled air to be blown out of a box body, thereby achieving a cooling objective.

Currently, the temperature adjustment fan on the market generally has two forms:

(1), the whole machine is directly packed without any changes so as to have problems of large package size and high costs; and (2), the whole machine is divided into an upper layer and a lower layer, a water tank is detachable and covers the upper layer during packing such that requirements of a machine size are high and appearance is bad, and the upper layer and the lower need to be fabricated to be an inwardly inclined surface so that the whole machine has great space waste.

Therefore, it is a problem urgent to be solved to provide a foldably packed temperature adjustment fan.

SUMMARY

An objective of the present invention is to provide a temperature adjustment fan capable of being quickly folded and packed.

In order to achieve the above objective, a technical solution provided by one embodiment of the present invention is as follows:

A foldably packed temperature adjustment fan comprises:
a water tank assembly, having a water storage cavity; and
a shell assembly, mounted on a top of the water tank assembly, wherein the shell assembly comprises a plurality of side plate assemblies for surrounding and forming an airflow cavity and a top plate assembly;
at least a part of the side plate assemblies are respectively utilized as a whole body and are detachably mounted on an edge of the top of the water tank assembly; and
at least a part of the side plate assemblies can be completely accommodated in the water storage cavity after being detached.

In one embodiment, the top plate assembly and one of the side plate assemblies are utilized as a whole body to form a front panel assembly.

In one embodiment, the front panel assembly is rotationally connected with an edge of the top of the water tank assembly.

In one embodiment, hinge assemblies are arranged between the front panel assembly and the water tank assembly, each hinge assembly comprises a first connecting rod and a second connecting rod which are hinged with each other, the first connecting rod is rotationally connected with the front panel assembly, and the second connecting rod is rotationally connected with the water tank assembly.

In one embodiment, the hinge assemblies are arranged on inner sides of the front panel assembly and the water tank assembly, and/or a distance between a hinged point of the second connecting rod and the water tank assembly and a top end of the water tank assembly is less than the length of the second connecting rod.

In one embodiment, the front panel assembly comprises a fan assembly, and the fan assembly is mounted on inner sides of the side plate assemblies.

In one embodiment, at least one side plate assembly respectively comprises a plurality of splice plate assemblies which are spliced, each splice plate assembly respectively as a whole body is detachably mounted on an edge of the top of the water tank assembly, and the splice plate assemblies can be completely accommodated in the water storage cavity after being detached.

In one embodiment, matched insert plates and slots are formed between the side plate assemblies and an edge of the top of the water tank assembly, and the insert plates and the slots match with each other to limit the side plate assemblies in a vertical direction.

In one embodiment, at least one side plate assembly is provided with a wet curtain assembly, the top plate assembly comprises a liquid distributor, the water tank assembly comprises a water pump, a hose is communicated with the water pump and the liquid distributor, and the water can be controlled to spray water in the water storage cavity to the wet curtain assembly through the liquid distributor.

The present invention further provides a folding method of the foldably packed temperature adjustment fan. The folding method comprises:

placing the detached multiple splice plate assemblies in the water storage cavity in an upper and down superposition manner;

vertically placing two oppositely arranged side plate assemblies on two opposite sides of an interior of the water storage cavity such that the two side plate assemblies and the splice plate assemblies surround a fan accommodating cavity in the water storage cavity;

covering an opening at a top end of the water tank by using a side plate assembly of the front panel assembly; and placing the fan assembly in the fan accommodating cavity.

The present invention has the following beneficial effects: when the temperature adjustment fan of the present invention is used, its appearance is the same as that of a normal unit; during packing, a rear plate assembly, a left side plate assembly and a right side plate assembly can be completely accommodated in the water tank assembly, a front panel assembly does not need to be detached, and as long as the front panel assembly is turned over, fast folding is completed; and the package size is small, associated components are less, and logistics transportation is convenient.

BRIEF DESCRIPTION OF THE DRAWINGS

To describe the technical solutions in the embodiments of the present disclosure or the prior art more clearly, the following briefly introduces the accompanying drawings required for describing the embodiments or the prior art. Apparently, the accompanying drawings in the following description show some embodiments in the present disclosure, and a person of ordinary skill in the art may still derive other drawings from these accompanying drawings without creative efforts.

DESCRIPTION OF THE EMBODIMENTS

To make persons skilled in the art better understand the technical solutions of the present invention, the following clearly and completely describes the technical solutions in embodiments of the present invention with reference to the accompanying drawings in the embodiments of the present invention. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Figure 1:
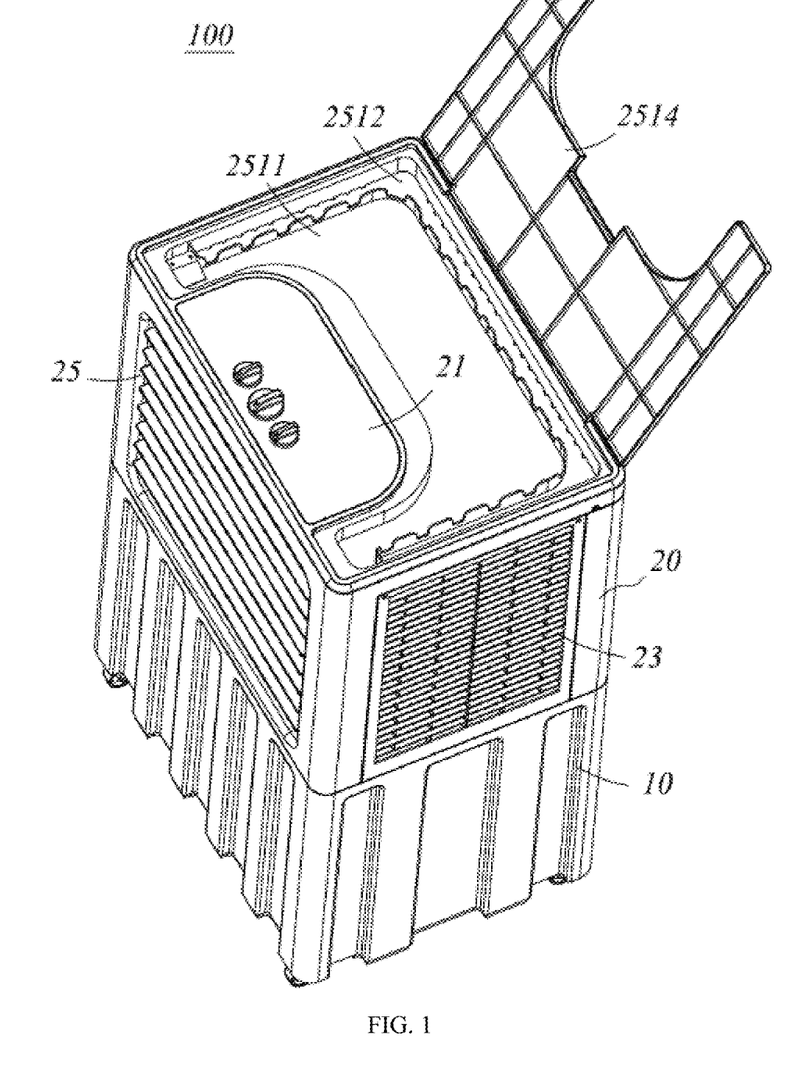
FIG. 1 is a schematic diagram showing a stereo structure of an embodiment of a temperature adjustment fan of the present invention.

Referring to FIG. 1, an embodiment of a temperature adjustment fan 100 of the present invention is introduced. In the embodiment, the temperature adjustment fan 100 comprises a water tank assembly 10 and a shell assembly 20.

Figure 2:
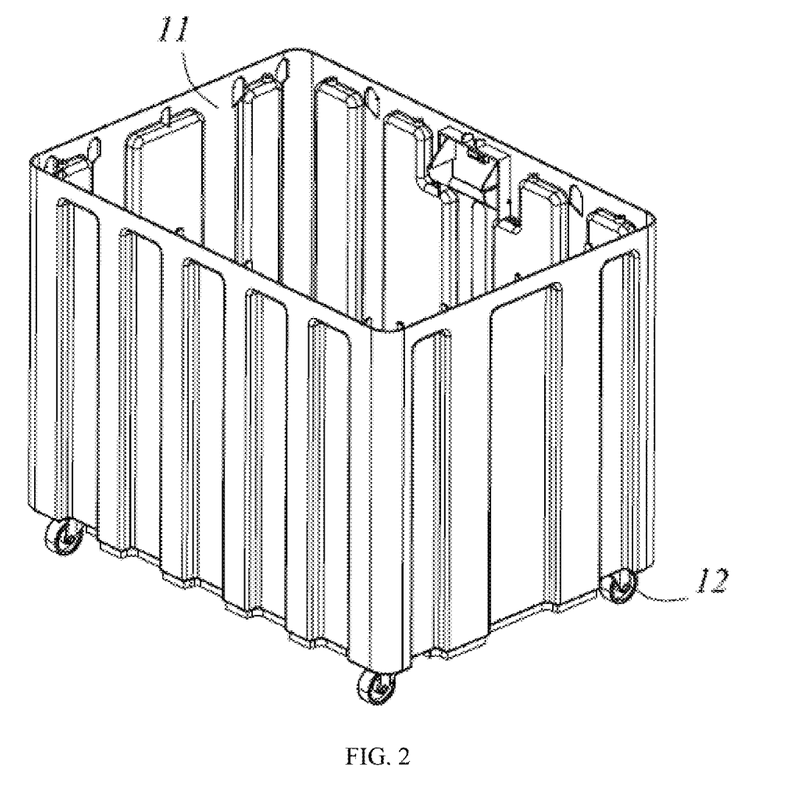
FIG. 2 is a schematic diagram showing a stereo structure of a water tank assembly in an embodiment of a temperature adjustment fan of the present invention.

Referring to FIG. 2, the whole water tank assembly 10 is a rectangular body and has a water storage cavity 11 with an opened top end, and the water storage cavity 11 is also correspondingly fabricated to be a rectangular body.

Four corners of the water tank assembly 10 are respectively provided with a roller 12, and through the rollers, the whole temperature adjustment fan 100 can be conveniently pushed to a target position.

The shell assembly 20 is mounted above the water tank assembly 10 to approximately form a rectangular body appearance, physical structures including a control panel 21, a lifting handle and the like (which are not shown in the drawings) can be arranged according to requirements, and the control panel 21 can be connected with a circuit or a control assembly in the temperature adjustment fan 100 in order that an operator adjusts, controls or sets functions of the temperature adjustment fan 100.

Figure 3:
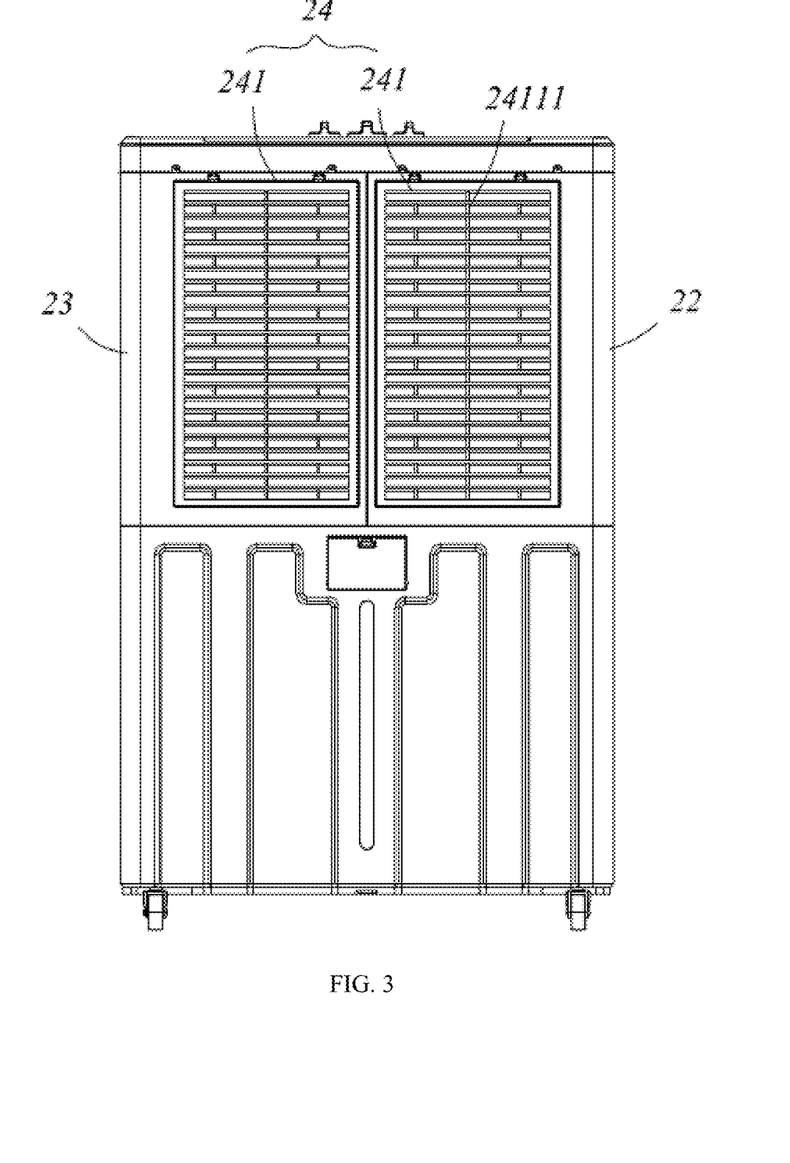
FIG. 3 is a rear view of an embodiment of a temperature adjustment fan of the present invention.

Referring to FIG. 3, the shell assembly 20 comprises a left side plate assembly 22, a right side plate assembly 23, a rear plate assembly 24 and a front panel assembly 25 for surrounding and forming an airflow cavity 26.

Figure 7:
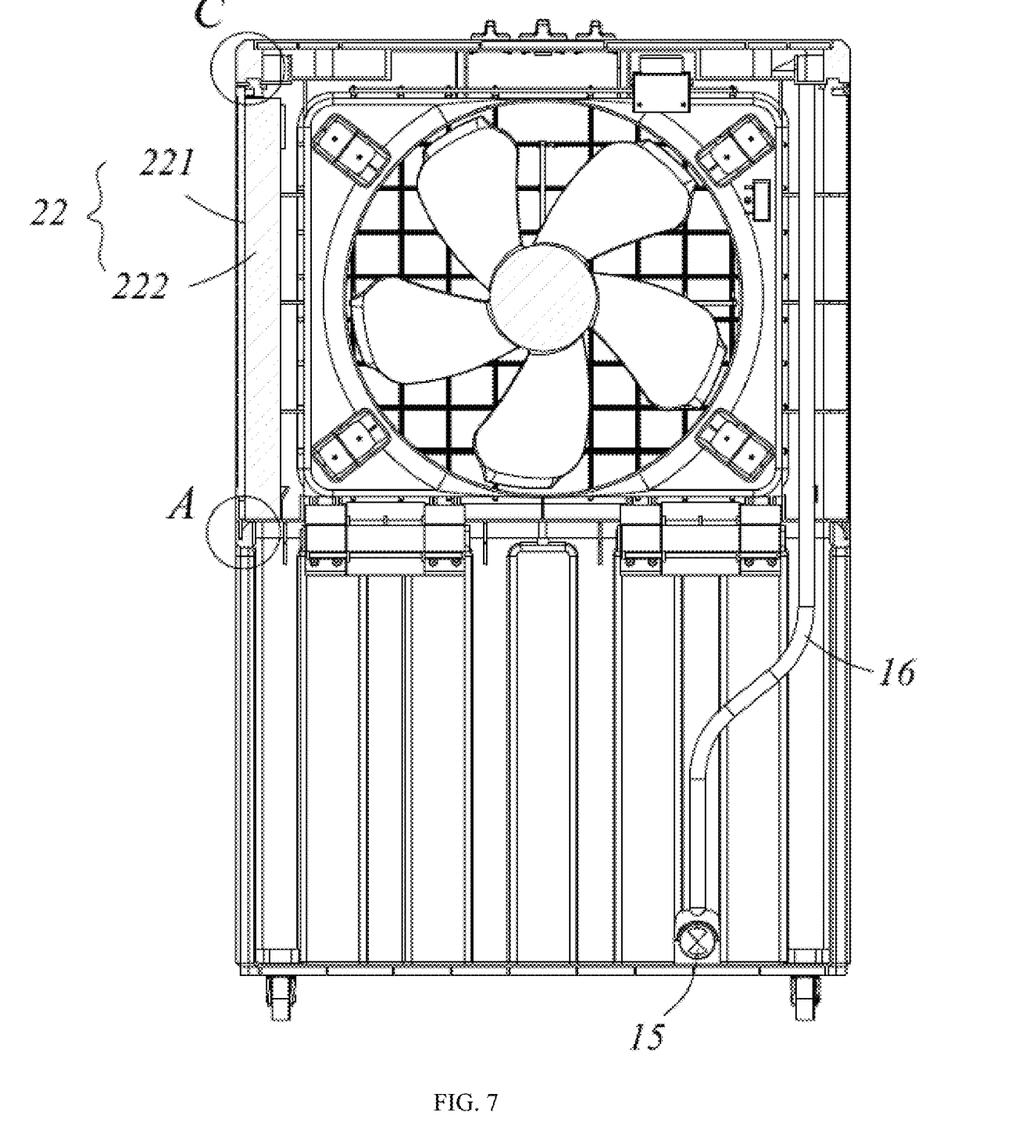
FIG. 7 is a front sectional view in an embodiment of a temperature adjustment fan of the present invention.

Referring to FIG. 7, the left side plate assembly 22 as a whole body is detachably mounted on an edge of the top of the water tank assembly 10.

In the embodiment, 'as a whole body' means that the left side plate assembly can be assembled in advance to be a whole component before the left side plate assembly is mounted on the water tank assembly.

In one embodiment, the left side plate assembly 22 is mounted at the top of a short side of the water tank assembly 10.

Figure 8:
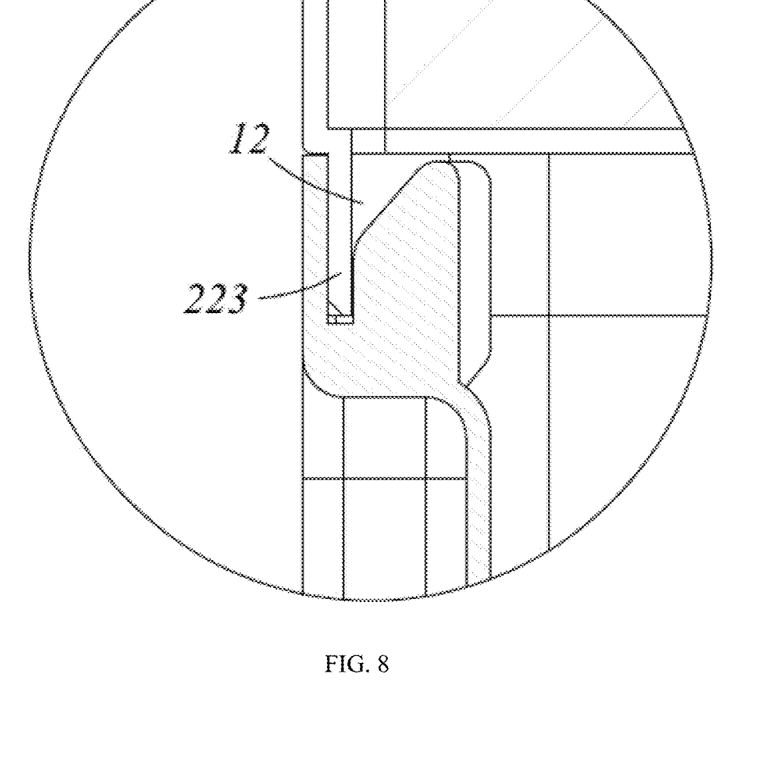
FIG. 8 is an enlarged partial diagram of a part A in FIG. 7.

Referring to FIG. 8, to achieve fast assembly and location of the left side plate assembly 22 and the water tank assembly 10, an insert plate 223 is protruded and extends from a bottom end of the left side plate assembly 22 downwards, and referring to FIG. 2, a slot 12 is formed in an inner side of a top end of the water tank assembly 10 in a matching manner.

When the left side plate assembly 22 is mounted, the insert plate 223 and the slot 12 are aligned to be assembled upper and down, and after the insert plate 223 is completely inserted in the slot 12, an outer side face of the left side plate assembly 22 and an outer side face of the water tank assembly 10 are located on the same vertical plane.

The left side plate assembly 22 comprises a left side plate 221 and a wet curtain assembly 222 mounted on an inner side of the left side plate 221, and an air intake grid 2211 (referring to FIG. 4) is formed in the left side plate 221.

The right side plate assembly 23 and the left side plate assembly 22 are oppositely arranged, the structure of the right side plate assembly 23 is the same as the structure of the left side plate assembly 22, and they are symmetrically arranged on two sides of the airflow cavity, so the specific structure of the right side plate assembly 23 is not described again.

Referring to FIG. 3, the rear plate assembly 24 is detachably mounted on an edge of the top of a long side of the water tank assembly 10.

In one embodiment, the rear plate assembly 24 comprises two splice plate assemblies 241 spliced in the same plane. The splice plate assemblies 241 respectively as a whole body are detachably mounted on an edge of the top of the water tank assembly 10.

In the embodiment, 'as a whole body' means that the splice plate assembly can be assembled in advance to be a whole component before the splice plate assembly is mounted on the water tank assembly.

Preferably, the two splice plate assemblies 241 have the same sizes and are symmetrically arranged.

Figure 4:
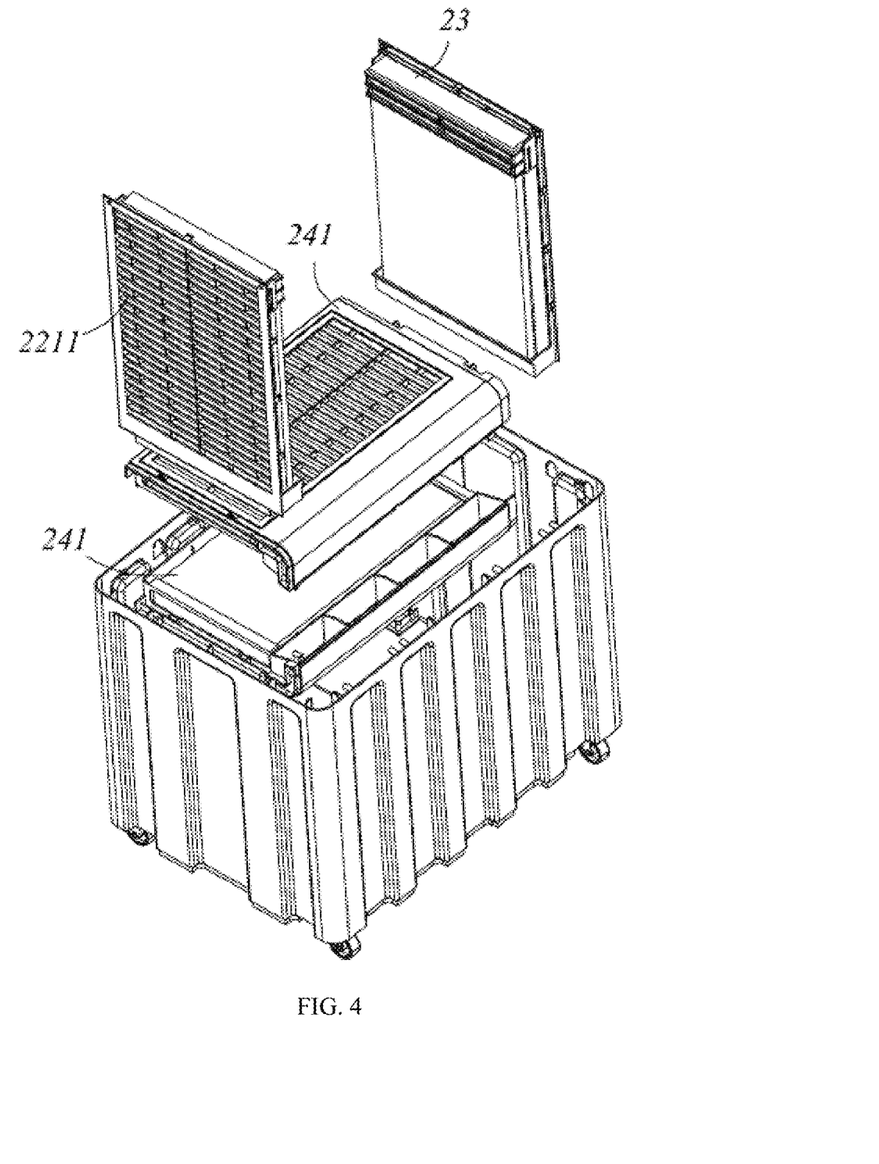
FIG. 4 is a schematic diagram showing a state before side plate assemblies are packed in a water tank assembly in an embodiment of a temperature adjustment fan of the present invention.
Figure 10:
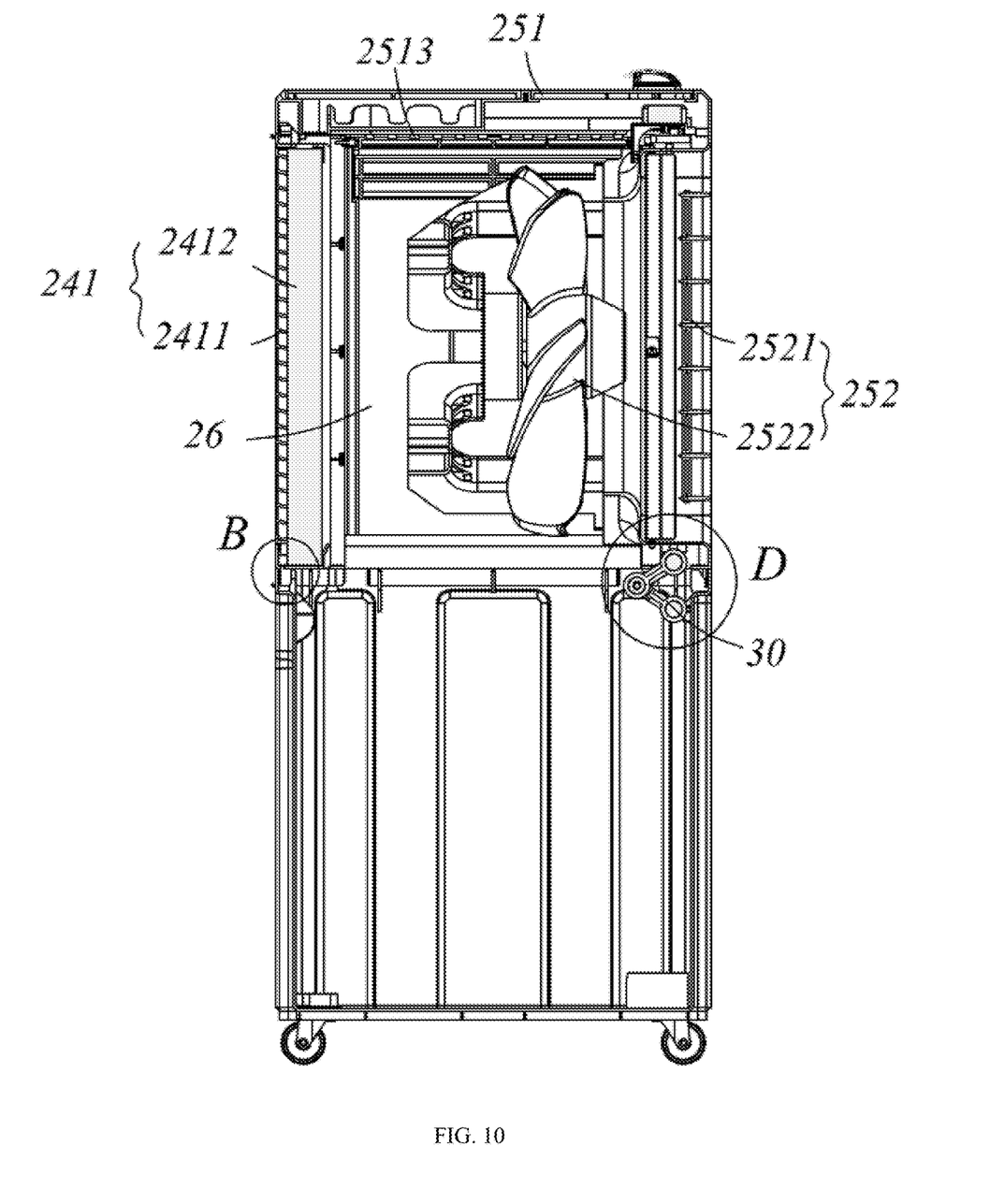
FIG. 10 is a side sectional view in an embodiment of a temperature adjustment fan of the present invention.
Figure 11:
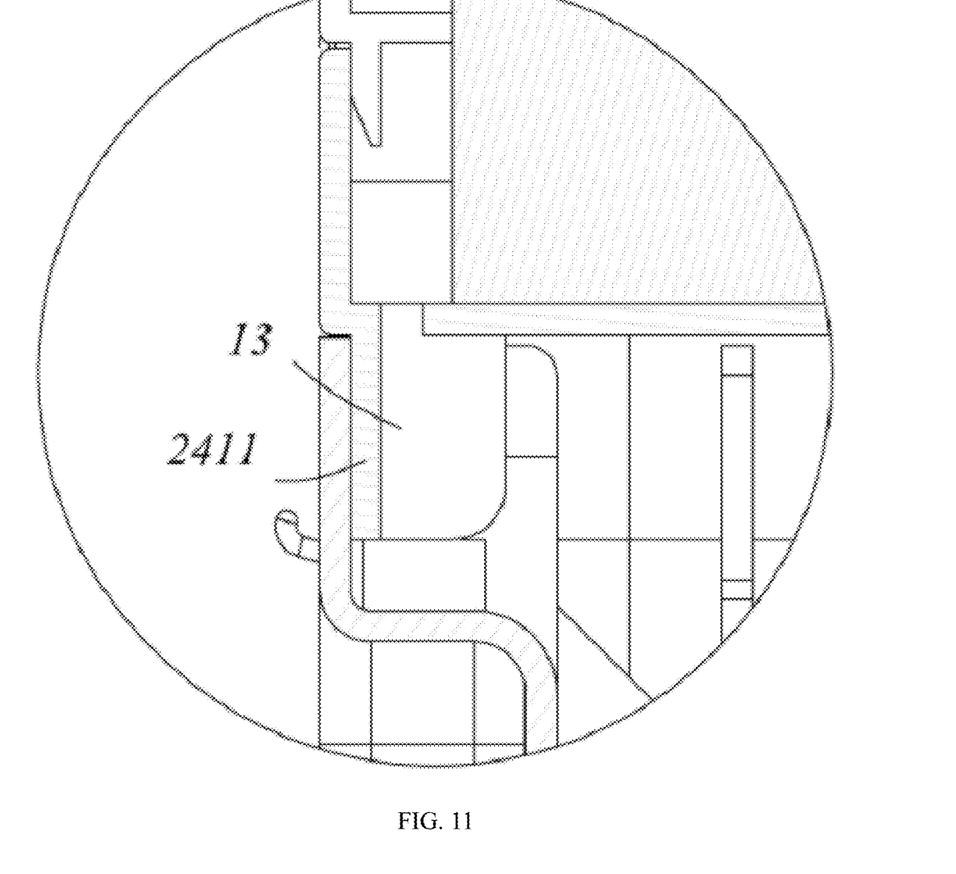
FIG. 11 is an enlarged partial diagram of a part B in FIG. 10.

Referring to FIG. 10 and FIG. 11, to achieve fast assembly and location of the splice plate assembly 241 and the water tank assembly 10, an insert plate 2411 is protruded and extends from a bottom end of the splice plate assembly 241 downwards, and referring to FIG. 4, a slot 13 is formed in an inner side of a top end of the water tank assembly 10 in a matching manner.

When the splice plate assembly 241 is mounted, the insert plate 2411 and the slot 13 are aligned to be assembled upper and down, and after the insert plate 2411 is completely inserted in the slot 13, an outer side face of the splice plate assembly 241 and a corresponding outer side face of the water tank assembly 10 are located on the same vertical plane.

The splice plate assembly 241 comprises a rear side plate 2411 and a wet curtain assembly 2412 mounted on an inner side of the rear side plate 2411, and an air intake grid 24111 (referring to FIG. 3) is formed in the rear side plate 2411.

Figure 6:
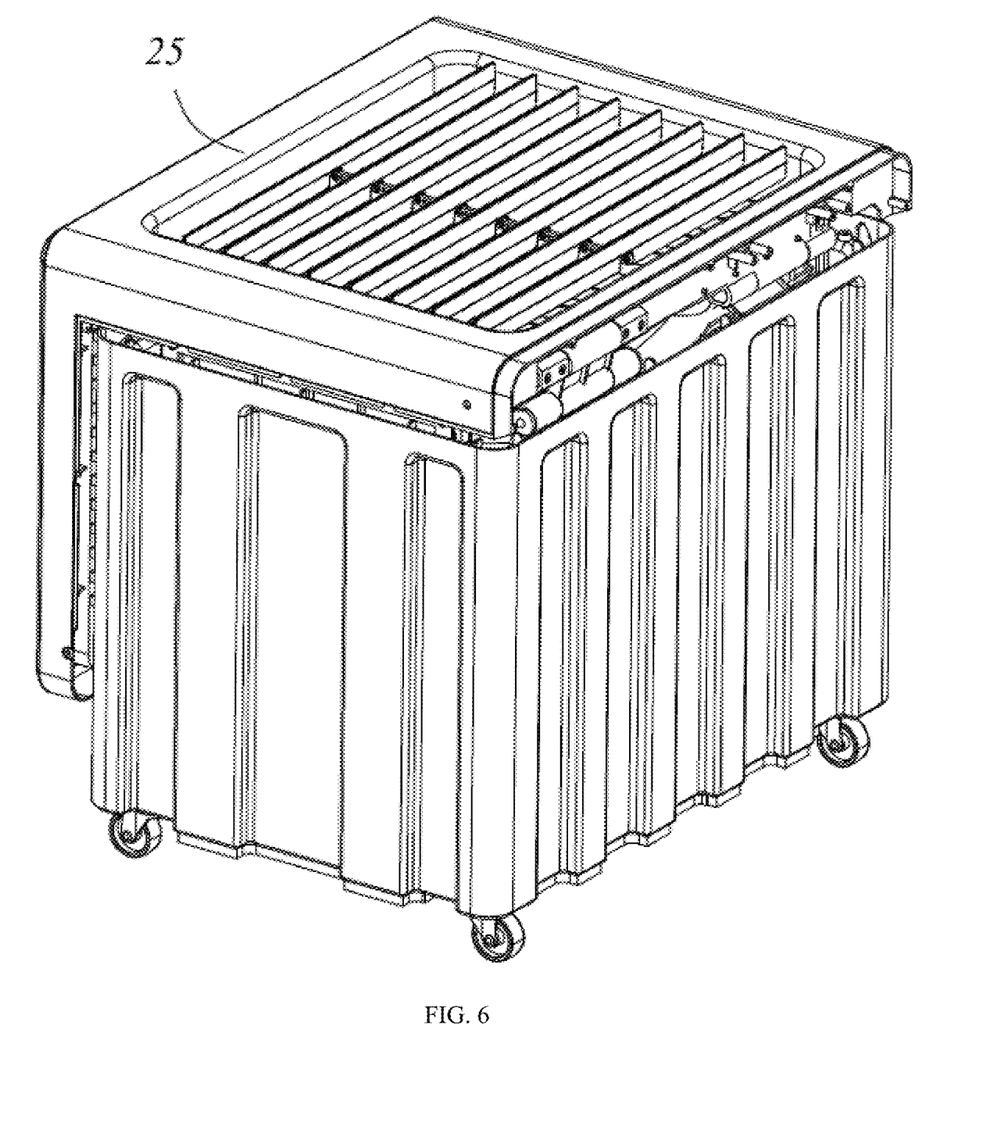
FIG. 6 is a schematic diagram showing a folding state in an embodiment of a temperature adjustment fan of the present invention.

Referring to FIG. 6, the front panel assembly 25 as a whole body is detachably mounted on an edge of the top of the water tank assembly 10.

In the embodiment, 'as a whole body' means that the front panel assembly 25 can be assembled in advance to be a whole component before the front panel assembly is mounted on the water tank assembly.

The front panel assembly 25 is generally arranged in an L shape and comprises a top plate assembly 251 and a front plate assembly 252, and in a preferred embodiment, a main body frame of the top plate assembly 251 and the front plate assembly 252 is integrally formed in an injection manner.

Referring to FIG. 1, the top plate assembly 251 comprises a top plate 2511 and a liquid distributor 2512 arranged on the top plate 2511, the liquid distributor 2512 comprises a water tank, water outlets 2513 (as shown in FIG. 10) are opened in a bottom end of the water tank, and the water outlets 2513 correspond to upper portions of the wet curtain assemblies 222, 2412.

In one embodiment, the water tank is sunken in a top surface of the top plate 2511, a cover body 2514 covers the water tank, and the cover body 2514 and the top plate 2511 are rotationally connected.

To improve a cooling effect, a certain amount of ice blocks or ice water is placed in the water tank.

Referring to FIG. 10, the front plate assembly 252 comprises a wind guide assembly 2521 and a fan assembly 2522 arranged on an inner side of the wind guide assembly 2521.

Referring to FIG. 7, the water tank assembly 10 further comprises a water pump 15 arranged at the bottom of the water tank assembly 10, the water pump 15 and the water tank of the of the liquid distributor through a hose 16, and in the embodiment, the water storage cavity 11, the water pump 15, the hose 16, the liquid distributor 2512, the wet curtain assemblies 222 and 2412 are sequentially communicated to form a circular water channel.

In the embodiment, the air intake grids of the left side plate assembly 22, the right side plate assembly 23 and the rear plate assembly 24 form an air inlet communicated with the airflow cavity 26, the wind guide assembly 2521 of the front plate assembly 252 forms an air outlet communicated with the airflow cavity 26, and the airflow cavity 26 is utilized as an airflow channel between the air inlet and an air outlet.

It should be noted that the airflow channel is not a limitation formed in the physical structure, that is, the airflow channel does not have strictly separation or boundary with other spaces in the cavity, but only an airflow path exists in the cavity, and through the air path, outside air enters the cavity from the air inlet of the shell assembly and flows out of the cavity through the air outlet of the shell assembly so as to form a complete air circulation.

In the embodiment, the water pump 15 can be controlled to spray water stored in the water storage cavity 11 to the wet curtain assemblies 222 and 2412 through the liquid distributor 2512. The wet curtain assemblies 222 and 2412 generally have high heat exchange efficiency, and when water sprayed on the wet curtain assemblies evaporates, the water absorbs heat of surrounding air so as to cool down the surrounding air, and these cooled air is blown out of a wind outlet through the airflow path to further reduce the temperature of the wind.

In one embodiment, at least a part of the wet curtain assembly is made of a metal material, the metal material has high heat exchange efficiency so as to be capable of providing relatively high heat exchange efficiency. Specifically, the wet curtain assembly in the embodiment may be metal honeycomb paper, the honeycomb paper has a porous honeycomb array arrangement structure, has relatively large specific surface area, and remarkably increase an evaporation area so as to further improve the heat exchange efficiency.

In one embodiment, the wet curtain assembly further may be metal honeycomb paper and papery honeycomb paper which are compounded with each other, a compounding layer number and compounding forms of the metal honeycomb paper and the papery honeycomb paper can be selected according to actual requirements, and by taking a three-layer compounding structure for example, the wet curtain assembly may be sequentially compounded metal honeycomb paper, papery honeycomb paper and metal honeycomb paper, or papery honeycomb paper, metal honeycomb paper and papery honeycomb paper.

In one embodiment, due to feasibility of a processing technique, the specific surface area of the metal honeycomb paper is greater than the specific surface area of the papery honeycomb paper, that is, the density of a honeycomb array arrangement structure of the metal honeycomb paper is greater than that of the papery honeycomb paper in order to provide a probability of having higher exchange efficiency. Furthermore, a material of the metal honeycomb paper may be selected according to design requirements, such as aluminum honeycomb paper, copper honeycomb paper or alloy honeycomb paper; and the shape of a honeycomb array unit on the honeycomb paper may also be circle, ellipse, polygon and the like.

Figure 9:
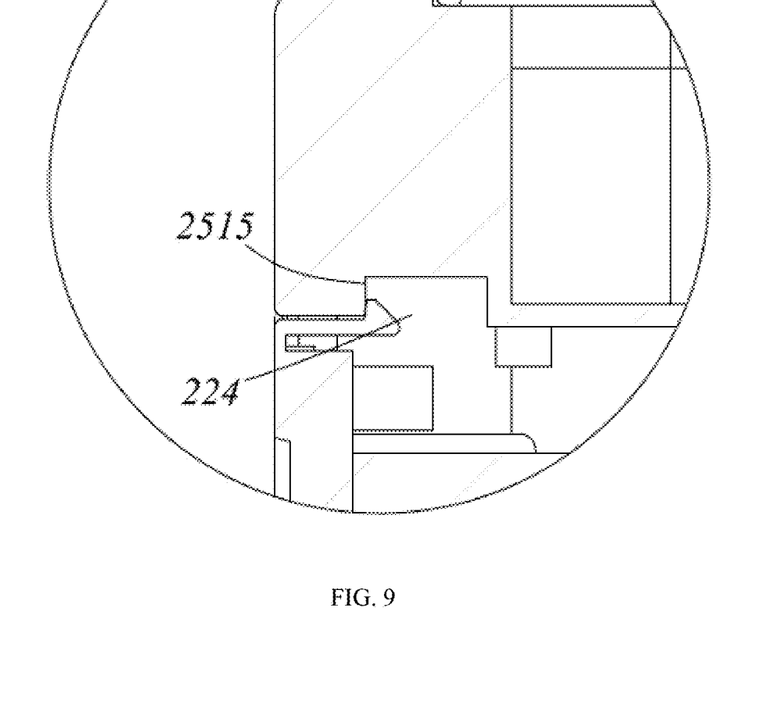
FIG. 9 is an enlarged partial diagram of a part C in FIG. 7.

Referring to FIG. 9, locating clamping slots 2515 and locating bumps 224 are formed at connecting portions between the top plate assembly 251 and the left side plate assembly 22, the right side plate assembly 23 and the rear plate assembly 24. The locating clamping slot 2515 and the locating bump 224 match with each other to form lateral limitation, but not limit lifting up of the top plate assembly 251.

Referring to FIG. 10, the front plate assembly 252 is rotationally connected with an edge of the top of the water tank assembly 10.

Figure 12:
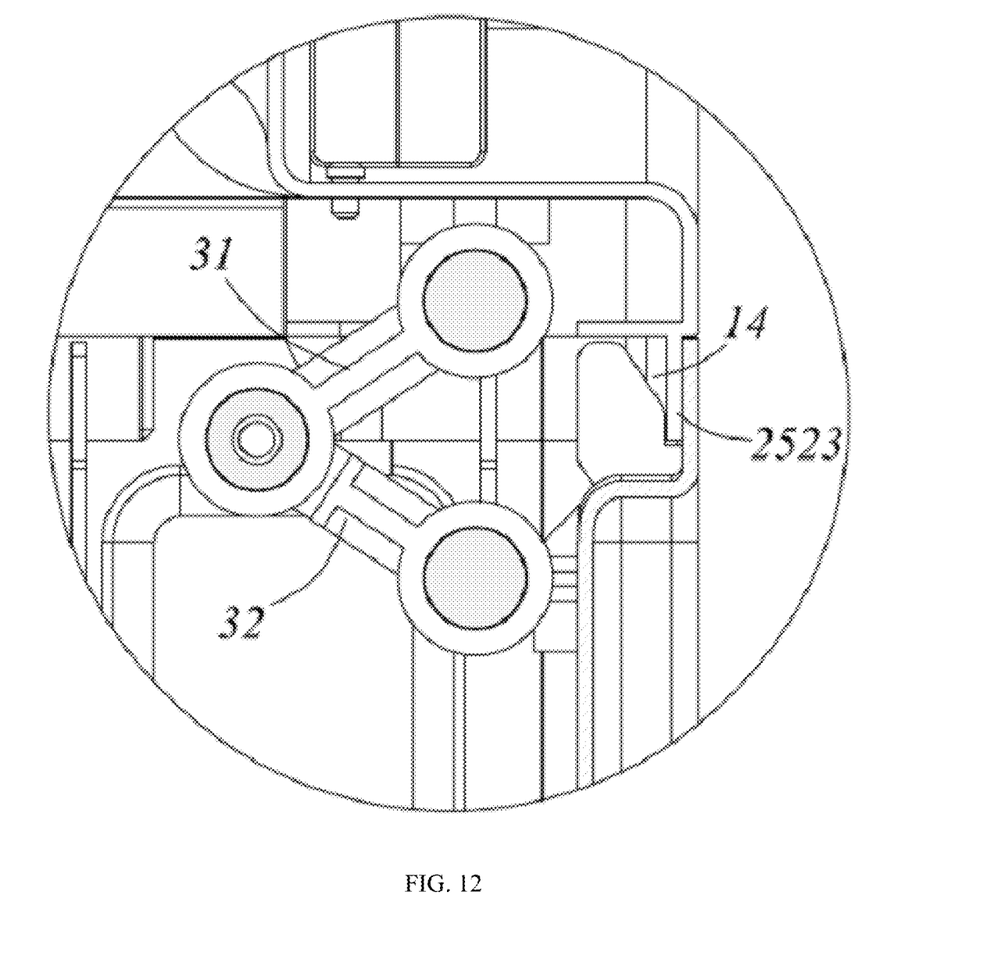
FIG. 12 is an enlarged partial diagram of a part D in FIG. 10.

In a preferred embodiment, hinge assemblies 30 are arranged between the front plate assembly 252 and the water tank assembly 10 and are arranged on inner sides of the front panel assembly and the water tank assembly. Referring to FIG. 12, the hinge assembly 30 comprises a first connecting rod 31 and a second connecting rod 32 which are hinged with each other, the first connecting rod 31 is rotationally connected with the front plate assembly 252, and the second connecting rod 32 is rotationally connected with the water tank assembly 10.

In a preferred embodiment, a distance between a hinged point of the second connecting rod 32 and the water tank assembly 10 and the edge of the top end of the water tank assembly 10 is equal to the length of the second connecting rod 32; and the length of the first connecting rod 31 is approximately equal to the thickness of the front plate assembly 252.

When the assembly of the temperature adjustment fan is completed, a hinged portion of the first connecting rod 31 and the second connecting rod 32 extends inwards the water storage cavity.

Referring to FIG. 12, to achieve fast assembly and location of the front plate assembly 252 and the water tank assembly 10, an insert plate 2523 is protruded and extends from a bottom end of the front plate assembly 252 downwards, and a slot 14 is formed in an inner side of a top end of the water tank assembly 10 in a matching manner.

Referring to FIG. 6, after the left side plate assembly 22, the right side plat assembly 23 and the rear plate assembly 24 are detached, the front plate assembly 252 can be lifted upwards such that the front plate assembly 252 and the water tank assembly 10 are not limited, the front plate assembly 252 turns over by 90 degrees to enable that the front plate assembly 252 horizontally covers the water storage cavity 11, and the top plate assembly 251 fits an outer side face of the water tank assembly 10. In such a state, the hinged point of the first connecting rod 31 and the second connecting rod 32 is located above the edge of the top end of the water tank assembly 10 so that the front plate assembly 252 can be turned over by more than 90 degrees.

Figure 5:
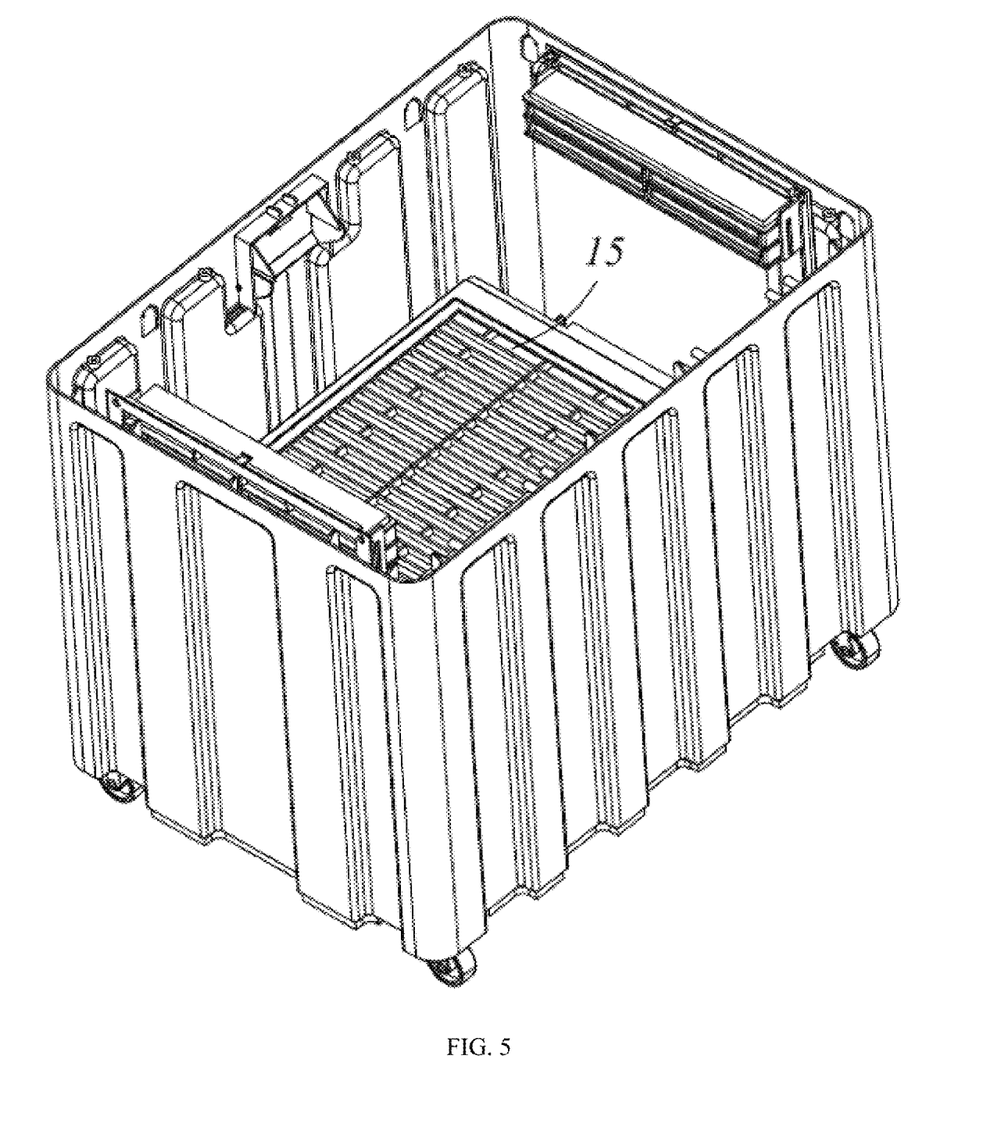
FIG. 5 is a schematic diagram showing a state after side plate assemblies are packed in a water tank assembly in an embodiment of a temperature adjustment fan of the present invention.

In a corresponding folding method of the temperature adjustment fan 100, the left side plate assembly 22, the right side plate assembly 23, the rear plate assembly 24 and the like need to be detached. The folding method comprises:

step 1: lifting up the whole front panel assembly 25 while turning over outwards (opposite to a direction of the water storage cavity 11) such that the front panel assembly 25 is respectively separated from the left side plate assembly 22, the right side plate assembly 23 and the rear plate assembly 24;

step 2: respectively lifting up the left side plate assembly 22, the right side plate assembly 23 and the rear plate assembly 24 so as to separate from the water tank assembly 10;

step 3: referring to FIG. 4, placing the detached two splice plate assemblies 241 at the center of the water storage cavity 11 in an upper and down superposition manner, and ensuring that the long sides of the splice plate assemblies 241 correspond to the long sides of the water tank assembly 10;

step 4: referring to FIG. 4, respectively vertically placing the detached left side plate assembly 22 and the right side plate assembly 23 on two sides of the splice plate assembly 241, and ensuring that short sides of the left side plate assembly 22 and the right side plate assembly 23 respectively correspond to short sides of the water tank assembly 10, wherein a state after the placement is completed is as shown in FIG. 5, the left side plate assembly 22 and the right side plate assembly 23 are respectively clamped between the splice plate assembly 241 and an inner wall of the box body assembly 10, and the left side plate assembly 22, the right side plate assembly 23 and the splice plate assemblies 241 form a fan accommodating cavity 15; and step 5: referring to FIG. 6, turning over the front panel assembly 25 inwards such that the fan assembly 2522 is accommodated in the fan accommodating cavity 15, the front plate assembly 252 covers the water storage cavity 11 and the top plate assembly 251 fits an outer side wall surface of the water tank assembly.

When the temperature adjustment fan needs to be assembled, similarly, firstly the left side plate assembly 22, the right side plate assembly 23 and the rear plate assembly 24 are mounted at the edge of the top end of the water tank assembly 10 in an insertion manner, the front panel assembly 25 is turned over such that the front panel assembly 25 is respectively limited to the left side plate assembly 22, the right side plate assembly 23 and the rear plate assembly 24.

In one embodiment, referring to FIG. 3, the rear plate assembly 24 and the top plate assembly 251 are fixed by screws 243.

In one embodiment, the top plate assembly 251 is further respectively fixed to the left side plate assembly 22 and the right side plate assembly 23 by screws.

To sum up, when the temperature adjustment fan of the present invention is used, its appearance is the same as that of a normal unit; during packing, the rear plate assembly, the left side plate assembly and the right side plate assembly can be completely accommodated in the water tank assembly, the front panel assembly does not need to be detached, and as long as the front panel assembly is turned over, fast folding is completed; the package size is small, associated components are less, and logistics transportation is convenient.

In some specific embodiments, the temperature adjustment fan of the present invention can further partially rather than completely include all assemblies/structures mentioned in the above embodiment so as to correspondingly achieve functions of the required assemblies. The following provides a plurality of specific embodiments:

Embodiment 1

A rear plate assembly 24 has an integrated structure and is not formed by multiple splice plates.

During packing, the rear plate assembly 24 is singly placed on a top surface of the front plate assembly 252, the water tank assembly 10 only accommodates the left side plate assembly 22, the right side plate assembly 23 and the fan assembly 2522.

That is, the embodiment mainly relates to improvement of the rear plate assembly 24, and cannot relate to the other.

Embodiment 2

No hinge assembly 30 is arranged between the front panel assembly 25 and the water tank assembly 10, the whole front panel assembly 25 can be separated from the water tank assembly 10.

During packing, the whole front panel assembly 25 can be lifted up and then turned over to cover the water tank assembly by people, but during packing and transporting, relative fixation of the front panel assembly 25 and the water tank assembly should be specially noted, and relative movement thereof is avoided.

That is, the embodiment mainly relates to improvement of the front panel assembly 25, and cannot relate to the other.

Embodiment 3

The top plate assembly 251 and the front plate assembly 252 are separately arranged.

In the embodiment, the top plate assembly 251 and the front plate assembly 252 can be firstly assembled and then integrally assembled to the water tank assembly 10.

Or, the front plate assembly 252 is firstly mounted on the water tank assembly, and then the top plate assembly 251 is assembled with the front plate assembly 252.

During packing, the top plate assembly 251 cannot be accommodated in the water tank assembly, and the top plate assembly can be placed on a top surface or the front plate assembly 252 or one side of the water tank assembly 10.

That is, the embodiment mainly relates to improvement of the front panel assembly 25, and cannot relate to the other.

Embodiment 4

The left side plate assembly 22 or the right side plate assembly 23 is formed by a plurality of splice plate assemblies.

The embodiment is especially applicable to a non-rectangle water storage cavity.

It should be noted that, the terms "comprises", "comprising" or any variation thereof are intended to cover a non-exclusive inclusion, such that a process, method, article, or apparatus that comprises a list of elements does not include only those elements but may include other elements not expressly listed or inherent to such process, method, article, or apparatus. Where no other restrictions are stated, the elements defined by the phrase "comprising a" do not exclude the presence of additional identical elements in a process, method, article, or apparatus that includes said elements.

For those skilled in the art, apparently, the present invention is not limited to details of the exemplary embodiments, and may be expressed in other specific forms without departing from the spirit or basic characteristics of the present invention. Therefore, in any way, the embodiments should be regarded as exemplary, not limitative; and the scope of the present invention is limited by the appended claims, instead of the above description. Thus, all variations intended to fall into the meaning and scope of equivalent elements of the claims should be covered within the present invention. Any reference signs in the claims shall not be regarded as limitations to the concerned claims.

Furthermore, it should be understood that although the description is described based on the embodiments, not every embodiment includes only one independent technical solution. This statement of the description is only for clarity. Those skilled in the art should treat the description as a whole, and technical solutions in all of the embodiments may also be properly combined to form other embodiments that will be understood by those skilled in the art.

What is claimed is:

1. A foldably packed temperature adjustment device, comprising:
    a fan;
    a water tank assembly, having a water storage cavity; and
    a shell assembly, mounted on a top of the water tank assembly, wherein the shell assembly comprises a top plate assembly and a plurality of side plate assemblies, the plurality of side plate assemblies surrounding and forming an airflow cavity;
    the plurality of side plate assemblies is utilized as a whole body and are detachably mounted on an edge of the top of the water tank assembly; and
    the water storage cavity is large enough for accommodating the plurality of side plate assemblies after the plurality of side plate assemblies is detached;
    wherein the top plate assembly and one of the plurality of side plate assemblies are utilized as a whole body to form a front panel assembly; the front panel assembly and the edge of the top of the water tank assembly are rotationally connected;
    wherein hinge assemblies are arranged between the front panel assembly and the water tank assembly, and each hinge assembly comprises a first connecting rod and a second connecting rod which are hinged with each other, the first connecting rod is rotationally connected with the front panel assembly, and the second connecting rod is rotationally connected with the water tank assembly; and
    wherein the hinge assemblies are arranged on inner sides of the front panel assembly and the water tank assembly, and a distance between a top end of the water tank assembly and a hinged point that connects the second connecting rod and the water tank assembly is less than the length of the second connecting rod.

2. The foldably packed temperature adjustment device according to claim 1, wherein at least one side plate assembly respectively comprises a plurality of splice plate assemblies which are spliced,
    each splice plate assembly respectively as a whole body is detachably mounted on an edge of the top of the water tank assembly, and
    the splice plate assemblies are detachable and the water storage cavity is large enough to accommodate the detached splice plate assemblies.

3. The foldably packed temperature adjustment device according to claim 1, wherein matched insert plates and slots are formed between the side plate assemblies and an edge of the top of the water tank assembly, and the insert plates are designed to insert into the slots to limit the side plate assemblies in a vertical direction.

4. The foldably packed temperature adjustment device according to claim 1, wherein at least one side plate assembly is provided with a wet curtain assembly,
    the top plate assembly comprises a liquid distributor,
    the water tank assembly comprises a water pump, a hose in communication with the water pump and the liquid distributor, and the water storage cavity is capable of spraying water at the wet curtain assembly through the liquid distributor.

* * * * *